United States Patent [19]

Rongone

[11] 4,063,979
[45] Dec. 20, 1977

[54] METHOD OF MAKING A TIRE
[75] Inventor: Ronald L. Rongone, Cuyahoga Falls, Ohio
[73] Assignee: The Goodyear Tire & Rubber Company, Akron, Ohio
[21] Appl. No.: 722,904
[22] Filed: Sept. 13, 1976
[51] Int. Cl.$^2$ ............................................. B29H 9/00
[52] U.S. Cl. .............................. 156/123 R; 156/334; 260/67 F; 260/887; 526/270
[58] Field of Search ................. 156/96, 110 R, 110 A, 156/123 R, 128 R, 128 T, 327, 334, 335; 260/5, 18 R, 887, 67 F, 67 UA; 526/270

[56] References Cited
U.S. PATENT DOCUMENTS

| | | | |
|---|---|---|---|
| 3,114,409 | 12/1963 | Iknayan et al. | 156/128 T |
| 3,580,800 | 5/1971 | Torti et al. | 156/110 X |
| 3,607,985 | 9/1971 | Tarney | 156/128 |
| 3,937,681 | 2/1976 | Nordsiek | 156/110 R X |

OTHER PUBLICATIONS

*Rubber Technology and Manufacture* edited by C.M. Blow, CRC Press, Cleveland, Ohio 1971, pp. 201–203, 320.
*Encyclopedia of Chemical Technology*, by Kirk–Othmer, 2nd Ed., vol. 10, Jan, 1967, Interscience Pub., New York, pp. 237–251.
*Encyclopedia of Chemical Technology*, by Kirk–Othmer, 2nd Ed., vol. 11, Jan. 1967, pp. 242–261, Interscience Pub., New York.

Primary Examiner—Charles E. Van Horn
Assistant Examiner—John E. Kittle
Attorney, Agent, or Firm—F. W. Brunner; J. D. Wolfe

[57] ABSTRACT

Method of making a tire having improved resistance to interface separation including the steps of compounding a sulfur curable diene rubber to give a masterbatch, forming said masterbatch into tire components, plying up the tire from said component and curing said tire, the improvement wherein the masterbatch contains 2 to 14 parts of furfural butadiene resin per hundred parts of masterbatch.

2 Claims, No Drawings

METHOD OF MAKING A TIRE

This invention relates to an improved tire containing rubber compositions that have improved resistance to ply separation. More particularly, this invention relates to an improved radial tire having enhanced resistance to cracking and/or ply separation as well as blooming.

In building tires on the so-called automatic tire building equipment, for example, the BRC/R-3 or GP machines, difficulties and problems have been experienced with ply or rubber layer separation and/or tread cracking. Generally this can be referred to as interface separation. In general, these difficulties are much more severe with radial tires than with bias tires.

I have discovered that the difficulties and problems indicated above are due to the rubber compound blooming which adversely effected the tack and adhesion of the various rubber layers in the tire. I have discovered that these difficulties and problems can be reduced and/or eliminated by changing the compounding of the rubber stock to produce a compounded rubber stock having improved resistance to bloom and improved tack initially and on storing for a period of time to give a tire having improved resistance to interface separation.

This improved tire is obtained by forming the various tire building components or layers such as fabric or steel reinforced rubber layers, for example, plies, breaker, belts and tread, with a natural or synthetic rubber or blend thereof compounded with extender oils, fillers such as carbon black and silica fillers, sulfur curatives, antioxidants and/or antiozonants and 2 to 14, and preferably 4 to 8 parts of furfural-butadiene resin per 100 parts of rubber and then adhering them together in toroidal shape in the cured state.

Broadly, the solution to interface separation in tires is improved by modifying the compounded sulfur curable diene rubbers, i.e. the usual masterbatch, by incorporating 2 to 14, and preferably 4 to 8 parts, of furfural-butadiene resin in the masterbatch and then using the thus modified masterbatch to produce the usual tire building components such as steel reinforced plies, breakers and tread, which are then assembled into a tire, shaped in a tire shaper and cured.

The modified masterbatch can be produced by incorporating the furfural-butadiene resin into rubber prior to, during or after formation of the masterbatch.

The nature of this invention can be more readily understood and its advantages appreciated from the following representative and illustrative examples wherein all parts and percentages are by weight unless otherwise designated.

EXAMPLE

The rubber stock suitable for making the various components of a tire were prepared on the mill by compounding the ingredients shown in Table 1 to give standard masterbatches referred to as tread stock, black-sided wall (BSW) stock, chaffer stock, liner stock and ply stock. Then four parts of furfural-butadiene resin was milled into each of the standard masterbatches to give a nonblooming or modified masterbatch.

These stocks, viz. standard masterbatch that bloomed and the nonblooming masterbatches were passed through an extruder or calendar to give the desired tire building components when cut to size and then used to build tires such as HR 78-14 on the automatic tire machines in the regular manner. The tires made with the nonblooming masterbatches were free of bloom and the rubber layers were adhered together better and resisted rubber layer separation better than tires made with the standard masterbatches which contained FB oil or resin.

Table

| Compounding Recipe | Tread Stock | BSW Stock | Chaffer Stock | Liner Stock | Ply Stock |
|---|---|---|---|---|---|
| Oil extended butadiene-styrene rubber | 123.75 | | | | |
| Oil extended high cis polybutadiene | 12.50 | | | | |
| Natural rubber | | 40.00 | 46.67 | 93.33 | 93.33 |
| Smoked Sheet #4 | | | 123.33 | 46.67 | 46.67 |
| Butadiene-styrene rubber | | 50.00 | | | |
| High cis polybutadiene | | 60.00 | 15.00 | 42.25 | 42.25 |
| High aromatic oil | 11.75 | | | | |
| Stearic acid | 2.00 | 1.00 | 2.00 | .50 | .50 |
| Paraffin wax | .80 | .38 | | | |
| Aryl p-phenylene diamine | 1.15 | 1.00 | | | |
| ISAF black | 80.00 | | 65.00 | | |
| Morpholinyl-2-benzothiazole disulfide | .80 | .50 | 2.40 | | |
| Tetramethyl thiuram disulfide | .15 | | | | |
| Zinc oxide | 3.00 | 3.50 | 5.00 | 5.00 | 5.00 |
| Sulfur | 1.35 | | | | |
| Naphthenic-paraffinic oil | | 9.50 | | 1.00 | |
| N U-3-dimethylbutyl-N-phenyl-p-phenylene diamine | | 3.00 | | | |
| Phenol-formaldehyde resin | | 5.00 | 3.00 | | 2.00 |
| FEF furnace black | | 50.00 | | | |
| Oil treated sulfur | | 2.81 | 1.56 | 2.81 | 2.81 |
| Rosin oil | | | 7.00 | 9.00 | 8.00 |
| Alkylated phenolic antioxidant | | | 3.00 | .60 | .60 |
| Hydrated silica | | | 20.00 | | |
| N-cyclohexythio phthalemide | | | 0.50 | | |
| Resorcinol | | | | 50.00 | 50.00 |
| Furnace black | | | | 1.50 | 1.50 |
| Hexamethylene tetramine | | | | 1.50 | 1.50 |
| 90% N-oxidiethylene benzothiazole 2-sulfenamide + 10% mercaptobenzothiazole sulfide | | | | .70 | .70 |
| Total | 240.25 | 177.31 | 211.46 | 183.11 | 183.11 |
| Furfural butadiene resin | 4 | 4 | 4 | 4 | 4 |

Table-continued

| Compounding Recipe | Tread Stock | BSW Stock | Chafffer Stock | Liner Stock | Ply Stock |
|---|---|---|---|---|---|
| Total | 244.25 | 181.31 | 215.46 | 187.11 | 187.11 |

The rubber compositions useful in the tires of this invention are obtained by compounding a viscous polymeric oil of furfural and a conjugated diene of 4 to 8 carbon atoms with the rubber and other rubber compounding agents. Use of this viscous polymeric oil reduces bloom of the rubber stocks and produces better adhesion between various tire components even after exposure in the factory for several weeks wherein rubber stocks compounded without polymeric oil of furfural and conjugated diene exhibited appreciable blooming and poor adhesion and consequently tire ply separation problems are experienced. As blooming in normal tire components progresses, the adhesion level decreases so that a stock refreshener, viz. a light naphtha wash, is required to regenerate sufficient building tack for tire construction. The refreshener treatment is not required for stocks containing the F-B oil or resin as they maintain a high building tack for long periods of storage in processes, and further, these FB oil resin containing stocks lead to tires with greater green strength and little or no component movement prior to cure.

The green strength of standard component tire stocks in the tire decreases when the refreshener diffuses or evaporates and the lower green strength permits the tire component to move more readily and thus to the formation of demarkation lines at the component interface which can lead to ply separation and cracking in these areas during tire service. One area, for example, where the component movement is critical is in the side wall interface.

Normally the viscous polymeric oil, available as a by-product from the solvent extraction of butadiene streams or related dienes with furfural and normally called FB oil or resin, is used in about 2 to 15 parts per hundred of rubber with the preferred range being 4 to 8 parts.

Instead of the rubber blends used in the Example, the synthetic rubbers can be used to obtain rubber compositions having improved resistance to bloom and other improved physical properties. For example, the commercial butadiene/styrene copolymer rubber can be used instead of smoked or pale crepe natural rubber. Other synthetic rubbers of the homopolymers of the dienes containing 4 to 12 carbon atoms or their copolymers with olefins containing 2 to about 20 carbon atoms, for instance, polyisoprene polybutadiene and butadiene acrylonitrile, can be used.

The FB resin oils can be compounded with the rubbers with the usual amounts of sulfur, accelerators, fillers to optimize the physical properties of the finally cured composition. Usually the normal cure conditions are utilized with these rubber compositions.

The FB resin oil is a Diels-Alder reaction product of furfural and butadiene which is a viscous polymeric oil containing aldehyde groups. The FB resin oils are available as a by-product of the furfural extraction of butadiene from hydrocarbon streams as described in Industrial & Chemical Engineer.ing, Vol. 39, p. 695, etc. and Vol. 40, p.p. 2216–2220.

While certain representative embodiments and details have been shown for the purpose of illustrating the invention, it will be apparent to those skilled in this art that various changes and modifications may be made therein without departing from the spirit or scope of the invention.

What is claimed is:

1. In a method of making a tire having improved resistance to interface separation, including the steps of compounding a sulfur curable diene rubber to give a masterbatch, forming said masterbatch into tire building components, including reinforcing material, plying up the tire building components into a tire and curing in a tire shaper to give a tire, the improvement comprising incorporating 2 to 14 parts of furfural-butadiene resin per 100 parts of said masterbatch.

2. The invention of claim 1 wherein 4 to 8 parts of furfural-resin per 100 parts of masterbatch is used.

* * * * *